Sept. 22, 1964  S. L. SEYMOUR  3,149,948
METHOD FOR FORMING MULTIFOCAL LENS BLANKS
Filed Oct. 7, 1957  3 Sheets-Sheet 1

INVENTOR.
SAMUEL L. SEYMOUR
BY Oscar L. Spencer
ATTORNEY

Sept. 22, 1964 S. L. SEYMOUR 3,149,948
METHOD FOR FORMING MULTIFOCAL LENS BLANKS
Filed Oct. 7, 1957 3 Sheets-Sheet 2

INVENTOR.
SAMUEL L. SEYMOUR
BY Oscar H. Spencer
ATTORNEY

Sept. 22, 1964 S. L. SEYMOUR 3,149,948
METHOD FOR FORMING MULTIFOCAL LENS BLANKS
Filed Oct. 7, 1957 3 Sheets-Sheet 3

INVENTOR.
SAMUEL L. SEYMOUR
BY
Oscar L. Spencer
ATTORNEY

United States Patent Office 3,149,948
Patented Sept. 22, 1964

3,149,948
METHOD FOR FORMING MULTIFOCAL LENS BLANKS
Samuel L. Seymour, Oakmont, Pa., assignor to Pittsburgh Plate Glass Company, a corporation of Pennsylvania
Filed Oct. 7, 1957, Ser. No. 688,560
8 Claims. (Cl. 65—39)

This invention relates to multifocal lens manufacture and more particularly to apparatus and method for forming the main or major lens blank and fusing the minor segment thereto in a single operation.

In the conventional manufacture of multifocal lens blanks the major lens blank and the minor segment blank are prepared by manufacturers of optical glass. The major lens blank may be made of crown glass or other suitable glass which is highly refined and free from seed, striae, and other imperfections which would impair the optical qualities of the spectacle lens. The minor segment is likewise made from highly refined glasses having a higher index of refraction than crown glass, such as barium and flint glasses. The barium glasses have a slightly lower melting point than crown glass, while the flint glasses usually have a considerably lower melting point. The glasses of the major blank and minor segment preferably have substantially the same coefficients of expansion.

The major and the minor segment blanks are made in a great variety of shapes and sizes by the glass manufacturers. These blanks are usually assembled in the manner hereinafter described and semi-finished by the various lens-processing companies. Some companies finish-grind and polish the lenses to the doctor's prescription or may sell them to opticians who maintain their own grinding and polishing operation. The minor segment is ground and polished to the desired shape by the semi-finishers and the face of the segment to be engaged by the major blank is ground and polished to stock minor focal fields usually expressed in diopters. A suitable depression or countersink is then formed in the major blank to receive the minor segment, the minor segment is placed in the depression, and the whole assembly heated to fuse the glass of the minor segment to the glass of the major blank. Thereafter, the segment side of the lens is finish-ground and polished.

The perimeter of the minor sgment is not always of circular form. Frequently, it is in the form of a semicircle, rectangle, or modifications thereof. The various shapes make it difficult to form correspondingly shaped segment-receiving depressions in the major blank. One usual practice is to grind and polish a circular depression in the major blank large enough to receive the minor segment and then completely fill the portions of the depression surrounding the minor segment with smaller shaped segments of crown glass. The whole is then fused together, so that only the minor segment is visible to the wearer.

When assembling the segments in the depression, great care must be exercised to maintain the base of the depression and the engaging face of the minor segment free from lint, dust, finger marks, and other foreign matter. Likewise, great care must also be exercised to avoid entrapping air between the segment face and the bottom of the depression. One general practice is to make the face of the segment engaging the depression of a slightly different shape than the depression, so that upon reheating, the segment will flow into the exact curve of the base of the depression and the entrapped air can escape during this reheating and reshaping of the segment. Another general practice is to assemble a major blank and a minor blank with one side of the minor slightly elevated by the introduction of a small glass wedge and heating the assembly to a temperature that the minor segment will soften, settle and fuse within the depression, and in doing so, push the air out of the interspace between the elements, the fusing thus taking place gradually from one side of the depression across to the opposite side.

Many prior attempts have been made to reduce the high cost of the above-described work performed by the semi-finishers of spectacle multifocal lenses. One solution would be to fuse the segment with the glass of the major blanks while forming the major blank, and several examples of apparatus and methods for doing this are found in the patented art. Some of these include pressing the blanks into shape, while others resort to the outmoded blowing operation. The degree of success attained by any of the patented methods is best measured by the fact that none are commercially practical. They all exhibit one or more of these falling faults when commercial production is undertaken:

(1) Dirt or entrapped air in the fusion contact area between the segment and the major blank;
(2) Misalignment of the segment; or,
(3) Incomplete fusion.

The disadvantages in the prior art method of producing multifocal lens blanks are successfully overcome by practicing the instant invention wherein a mold is prepared having a recess or countersink of configuration complementary to a minor segment. A minor segment having an optically finished surface is preheated to a temperature below its softening point and then placed within the recess or countersink with its finished surface facing upwardly, and molten glass of optical quality to form the major blank is fed from a glass furnace discharge orifice into the mold and onto the mold surface in such a manner that the molten glass does not contact the preformed segment, but has a part of its perimeter in close proximity thereto. A molten mass of glass is allowed to accumulate in the mold and the feed is then stopped. Immediately thereafter, the accumulated mass of molten glass is laterally pushed, so as to flow over the mold surface and the finished surface of the minor segment and to fuse to the segment without the entrapment of air at the interface or area of fusion. Subsequently, if necessary or desirable, the distributed mass, while still in its molten condition, may be subjected to a vertically directed pressing with a suitably shaped molding member to further complete the composite lens blank.

Therefore, the primary object of the present invention is to provide a method of forming the major element of a multifocal lens blank from molten glass simultaneously with fusion of such element with at least one preformed minor segment to provide a fused composite structure.

Another object of this invention is to provide a method of forming multifocal spectacle lens blanks in which the molten glass of the major blank fuses to the preformed minor segment without entrapping air at the interface or area of fusion.

A still further object of this invention is to provide a method wherein a molten mass of glass is allowed to flow into a mold in close proximity to a preplaced minor segment, and is laterally pushed over the minor segment to fuse in intimate contact thereto and avoid the entrapment of air at the interface.

Another and still further object of this invention is to provide a method wherein a molten mass of glass is allowed to flow into a mold in spaced, close proximity to a preplaced minor segment, is laterally pushed over the minor segment to fuse thereto and avoid the entrapment of air at the interface, and subsequently is vertically pressed, so as to form a composite multifocal lens blank.

A further object of this invention is to provide apparatus for carrying out the method of the preceding objects.

These and other objects and features of this invention will be apparent from the following description and drawings in which.

Figure 12:
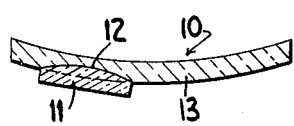
FIG. 12 is a sectional view of one form of a fused composite lens blank.
Figure 13:
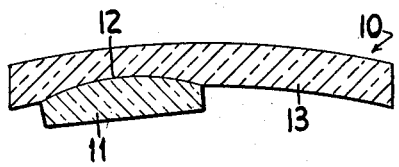
FIG. 13 is a sectional view of another form of a fused composite lens blank.

Referring now to the drawing, and in particular to FIGS. 12 and 13, there are illustrated different forms of composite lens blanks each generally identified at 10, and each comprising a minor segment 11, which may be of barium or flint glass and of any desired peripheral shape, having an optically finished surface 12 fused to a major element 13, which may be of crown glass. As illustrated in FIG. 13, and unlike the usual composite lens blank of FIG. 12, the blank 10 is formed with the minor segment fused to its concave side. In either form, the minor segment may itself be a composite preformed structure without departing from the spirit of this invention.

Turning now to FIGS. 1 to 4, there is illustrated a mold, generally identified at 14, comprising a mold body or housing 15 and a mold insert 16 received in the body 15. The inner periphery of the body 15 defines the peripheral shape of a blank 10, while the insert 16 is formed with a spherical molding surface 17 to define the curvature of the blank, and, as illustrated, the surface 17 is concave, resulting in the FIG. 12 form of blank.

The insert 16 is provided with a suitably shaped recess or countersink 18, the defining wall or walls of which intersect the surface 17, to receive a minor segment 11. The recess or countersink is of a complementary shape to that of the minor segment and just slightly larger than the segment in outline, so as to prevent the shifting of the minor segment during the fusing operation and to allow expansion of the segment and prevent its becoming cracked or broken during the fusing and forming operation. The minor segment 11 is preformed with the optically finished surface 12 and is disposed with the recess 18 so that the surface 12 faces upwardly. The recess 18 preferably should be of such a depth that the upward peripheral edge or edges of the minor segment 11, or in other words, those edges which define the surface 12, are flush with or extend only very slightly above the surface 17 when the minor segment is placed within the mold 14. This, as will be later apparent, assists in preventing the entrapment of air at the interface and edge between the surface 12 and the mass of glass which is to form the major element 13.

The mold housing 15 is provided with an outwardly extending bottom flange 19 which supports parallel, upstanding track members 20, 20, the upper surfaces 21, 21 of which form tracks for guiding spaced, flanged guide wheels 22, 22. The track members 20, 20 are properly spaced by means of track tie rods 23, 23, as illustrated. A shaping roll 24 is centrally disposed between the guide wheel 22, 22 and is arranged for concurrent rotation with the wheels by means of the shaft 25. The concurrent rotation of the wheels and roll may be accomplished in several different ways, as will be apparent to anyone skilled in the art as, for example, keying the roll to the shaft or providing stub shafts extending from the roll. A pair of spaced draw bars 26, 26 are provided and are rotatably journaled on the shaft 25 between the roll 24 and the wheels 22, 22 as illustrated. The pair of draw bars is maintained in spaced parallel relation by means of a tie rod 27.

Figure 1:
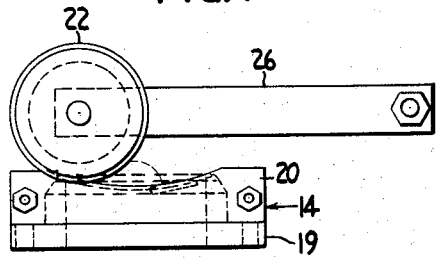
FIG. 1 is a side elevation of one form of apparatus for carrying out the method of this invention wherein a molten mass of glass is laterally moved over a preformed minor segment placed within a mold.
Figure 3:
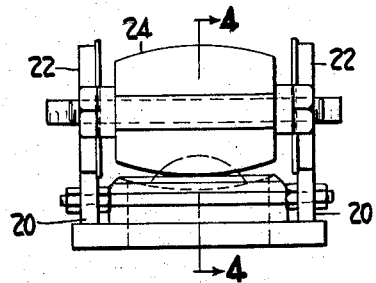
FIG. 3 is a front elevation of the apparatus of FIG. 1.
Figure 2:
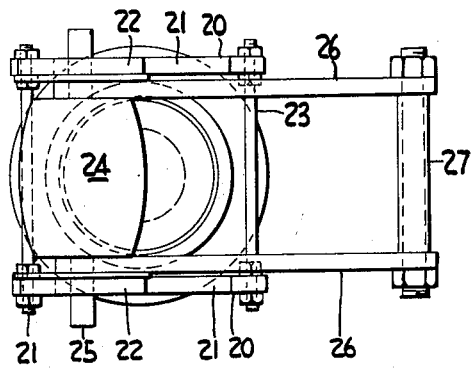
FIG. 2 is a plan view of the apparatus of FIG. 1.
Figure 4:
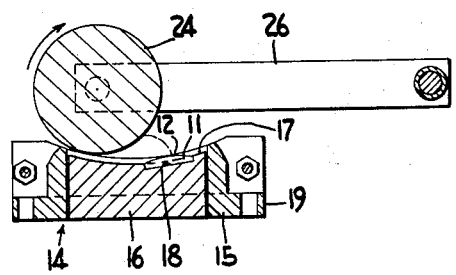
FIG. 4 is a sectional view taken on line 4—4 of FIG. 3.
Figure 5:
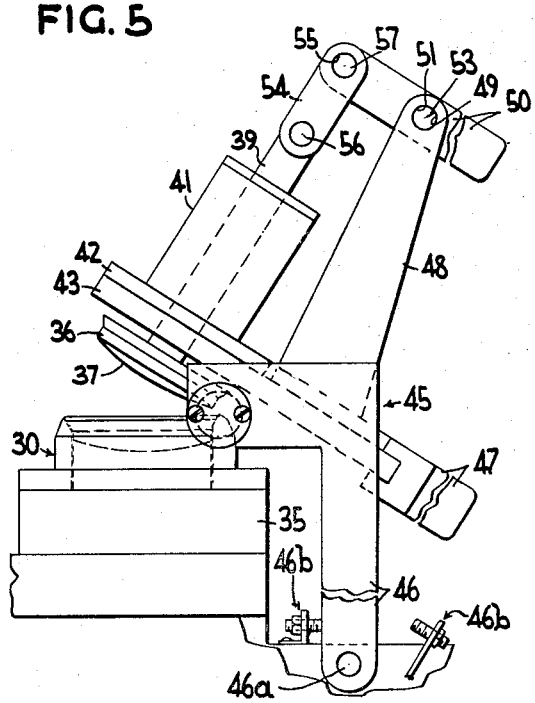
FIG. 5 is a side elevation of another form of apparatus for carrying out the method of this invention and illustrating means for laterally moving and subsequently vertically pressing the molten glass, the male mold member being illustrated in its position before rotation of its supporting means.

The surfaces 21, 21 of the track members 20, 20 have a central arcuate portion with a curvature substantially the same as that of the curvature of the mold surface 17 taken on a central axis, this being particularly illustrated in FIG. 4. The roll 24 is barrel-shaped, so that the curvature of its defining surface is substantially the same as the curvature of the mold surface 17 taken on a central axis perpendicular to the aforesaid one, this being particularly illustrated in FIG. 3.

A stream of molten glass from a suitable glass melting furnace discharge orifice (not illustrated in FIGURES 1 to 4) is allowed to flow into the mold 14, the orifice and the mold 14 being relatively positioned so that the molten glass will flow into the mold and impinge on the mold surface 17 closely adjacent to, but in spaced relation to the edge of the minor segment 11. A suitable quantity of molten glass is allowed to accumulate in the mold and the stream is severed by means of a conventional shearing device. The accumulated molten glass mass is then progressively laterally moved across the surface 17 and across the surface 12 of the minor segment 11 by means of the shaping roll 24 with a rolling or wiping action. Because of the translation of the roller 24 and its rotation, the direction of which is indicated by the arrow, the molten glass is distributed over the entire mold surface. One method of moving the roll 24 is by grasping the tie-rod 27 and moving it to the right, as viewed in the drawings. Of course, mechanical means may be provided for accomplishing this step. The lateral movement must be imparted to the molten glass before it has an opportunity to become unduly chilled and thereby possess a chilled skin. The rolling or wiping action of the molten glass across the minor segment will discharge any air between the molten mass of glass and the minor segment, so that entrapment of air in the weld will not occur. If the minor segment extends too far above the surface 17 of the mold, air may be trapped at this point which expands, thus creating a void in the blank. Large voids would render the blank unusable, small voids would disappear upon the finish grinding of the blank. After formation and upon cooling, the blank may be removed from the mold.

Turning now to FIGS. 5 to 8, there is illustrated apparatus for preparing lens blanks, comprising a mold, generally identified at 30, having a housing 31 and a mold insert 32 received in the housing 31. Similar to the described embodiment, the inner periphery of the housing 31 defines the peripheral shape of a blank 10, while the insert 32 is formed with a spherical molding surface 33 to define the curvature of the blank. Here, since a concave molding surface is provided, a blank of the FIG. 12 form will be produced.

The insert 32 is provided with a suitably shaped recess or countersink 34, the defining wall or walls of which intersect the surface 33, to receive a minor segment 11.

The recess or countersink is of a complementary shape to that of the minor segment and just slightly larger than the segment in outline, so as to prevent the shifting of the segment during the fusing operation and to allow for expansion of the segment and prevent its becoming cracked or broken during the fusing and forming operation. The mold 30 is supported on a suitable support means 35, such as the table of a turret machine having various stations to which the table may be indexed, such as preheating, filling, forming and cooling stations.

Associated with the mold 30 is a male mold member 36 for preforming the dual function of laterally moving molten glass over the minor segment 11 and the mold surface 33, and vertically pressing the molten glass in the mold 30. The male mold member 36 has a peripheral shape substantially complementary to that of the inner periphery of the housing 31 and a spherical concave molding surface 37 of the desired shape of one side of the blank 10. The male mold member 36 is mounted for rotation about an axis 38 vertically spaced from the surface 33 and closely adjacent the inner peripheral edge of the mold housing 31, and also is mounted for vertical movement, as will now be described.

A rod 39 is threadably received in the male mold member 36 so as to be normal thereto, the rod 39 being provided with an aperture 40 in its terminal end removed from the member 36. A flanged cylindrical member 41 surrounds the rod 39, the flange 42 of the member 41 being connected in any conventional manner to an apertured plate 43. A pair of spaced cylindrical resilient packing members 44, 44, the function of which will be later described, are retained within the member 41 and surround and engage the rod 39. The apertured plate 43 is the web portion of a bracket, generally identified at 45, pivotably mounted by means of suitable pivot means, so as to rotate on the axis 38. The bracket 45, in addition to the web portion 43, is constructed to have a pair of spaced depending L-shaped members 46, 46, mounted on suitable pivots 46a to swing the entire assembly away from the rotating table to permit clearance for the mold during the indexing of the table top. The movement of the brackets 45 is limited by suitable adjustable stop means 46b, as illustrated. The bracket 45 is thus suitably mounted for supporting the male mold, etc., yet allowing movement in a manner to be described.

A handle 47 is attached to the plate 43, so as to provide means whereby the bracket and the cylindrical member 41, and thereby the male member 36, may be rotated about the axis. Of course, it is to be understood that other means, such as mechanical means, may be provided for rotating the bracket about its pivot without departing from the spirit of this invention.

An upstanding support 48 is connected at the end to the plate 43 and is bifurcated at its other end, the bifurcated portion being provided with aligned apertures 49 therethrough. A handle 50 having a pair of spaced apertures 51 and 52 is received in the bifurcated portion of the support 48 and a pivot pin 53 is provided which passes through the apertures 49 and 51. The other aperture 52 in the handle 50 is disposed at one of its terminal ends, this terminal end being received in a bifurcated portion of link member 54, the line member being provided with apertures 55 and 56 at its opposite terminal ends. A pin 57, passing through the apertures 52 and 55, connects the handle 50 and one end of the link 54, and a pin 58, passing through the apertures 40 and 56, connects the other end of the link 54 and to the rod 39.

Figure 7:
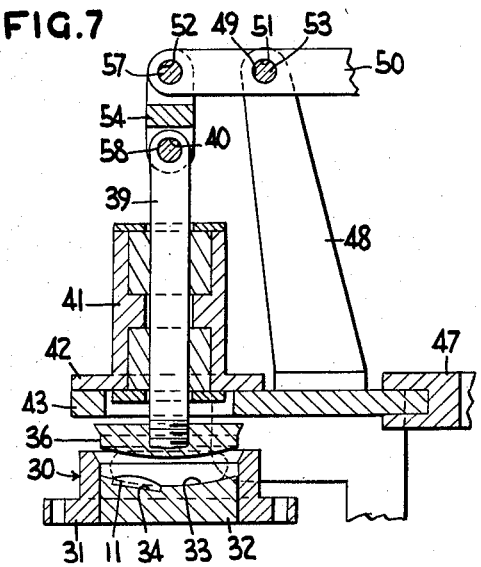
FIG. 7 is a sectional view of the apparatus of FIG. 5 showing the male mold member after rotation of its supporting means.
Figure 6:
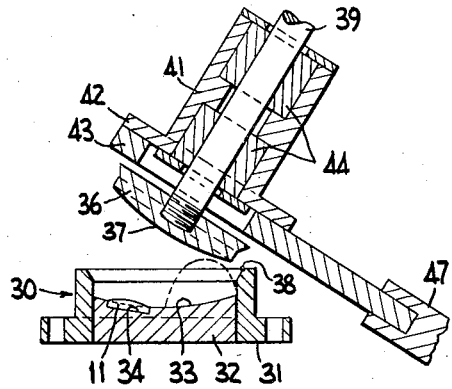
FIG. 6 is a sectional view of the apparatus of FIG. 5.
Figure 8:
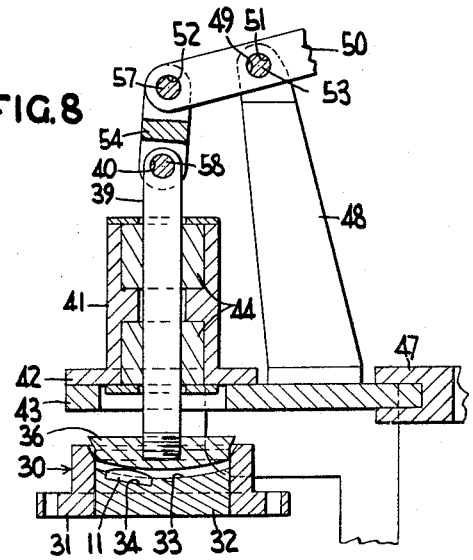
FIG. 8 is a sectional view of the apparatus of FIG. 5 showing the male mold member after the vertical pressing operation.

In the same manner as described with reference to FIGURES 1 to 4, a stream of molten glass from a suitable glass melting furnace discharge orifice (not shown in FIGURES 5 to 8) is allowed to flow into the mold 30, the orifice and the mold being relatively positioned so that the molten glass will flow into the mold and impinge on the mold surface 33 closely adjacent to, but in space relation to the edge of the minor segment 11. A suitable quantity of molten glass is allowed to accumulate in the mold and the stream is severed by means of a conventional shearing device. Immediately thereafter, the handle 47 is grasped and moved upwardly in an arc causing the bracket 45 to pivot about the pivot 46a and the entire assembly moves into the correct position for carrying out the process to be described. The left stop means 46b limits the travel of the members 46, 46, so that the pivot point 38 is accurately positioned for the molding member 36 to make final mating engagement with the inside of the mold housing 31. A continued upward pull on the handle 47 causes the attached cylindrical member 41 and the male mold member 36 to rotate about the axis 38. The male mold member 36 contacts the molten glass in the mold and laterally distributes the molten glass over the mold surface 33 and the polished surface 12 of the insert 11, the glass being confined only by the mold housing. Rotation in the aforesaid manner is discontinued when the male mold member is in its horizontal position, as illustrated in FIGURE 7. Suitable stop means may be provided for preventing further rotation of the handle and the attached means, if necessary or desirable. Immediately thereafter, the handle 50 is grasped and moved upwardly causing it to pivot about the pin 53. Pivoting of the handle 50 applies a downwardly directed force through the link 54 to the rod 39 connected to the male mold member 36. The male mold member 36 therefore applies a downwardly directed force on the molten glass in the mold 30 to thereby further press the blank to its ultimate shape. The above steps are then reversed, so as to move the male mold member from engagement with the molten glass, and away from the rotating table. The blank is then allowed to cool so that it may be removed from the mold.

The packing members 44 hold the rod 39 from moving relative to the cylinder 41 when the male mold member 36 is rotated about the pivot 38 and engages the molten glass, yet allows vertical movement of the rod 39 when the handle 50 is moved upwardly.

Figure 9:
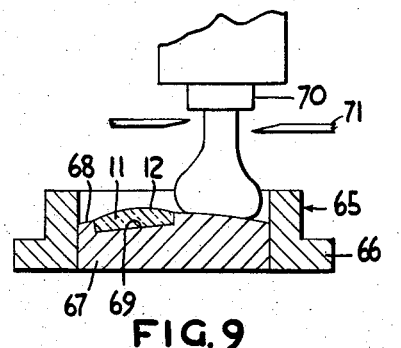
FIG. 9 illustrates sectionally a mold having a preformed minor segment therein, and the flowing of molten glass into the mold.
Figure 10:
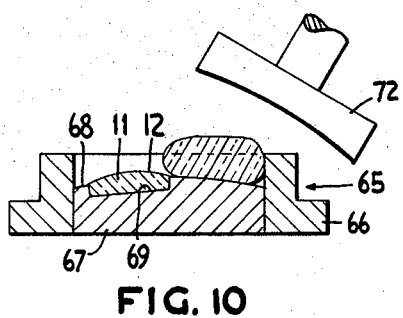
FIG. 10 is similar to FIG. 9 and illustrates the accumulated molten glass mass in the mold and a means whereby the molten glass is laterally pushed across the minor segment to avoid the entrapment of air at the area of fusion.
Figure 11:
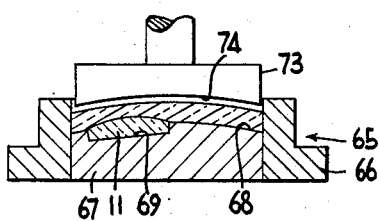
FIG. 11 is a view similar to FIG. 10 and illustrates the vertical pressing operation performed to further form the composite lens blank.

Turning now to FIGURES 9 to 11, there is illustrated a mold, generally indicated at 65, comprising a mold body or housing 66 and a mold insert 67 received in the body 66. As in the case of the other embodiments, the inner periphery of the housing 66 defines the peripheral shape of a blank 10, while the insert 67 is formed with a surface 68 to define the curvature of the blank. In this embodiment as is illustrated, the surface 68 is convex, so that the blank will be of a form illustrated in FIGURE 13.

The insert 67 is provided with a suitably shaped recess or countersink 69, the defining wall or walls of which intersect the surface 68 to receive a minor segment 11. The recess or countersink is of a complementary shape to that of the minor segment and just slightly larger than the segment, so as to prevent the shifting of the minor segment during the fusing operation and to allow expansion of the segment and prevent its becoming cracked or broken during the forming operations. A minor segment 11 is preformed with the optically finished surface 12 and is so disposed within the recess 69 that the surface 12 faces upwardly. The recess 69 preferably should be of such a depth that the upward peripheral edge or edges of a minor segment 11, or in other words, those edges which define the surface 12, are flush with or extend only very slightly above the surface 68 when a minor segment is placed within the mold 65. This, as previously explained, assists in preventing the entrapment of air at the interface between the surface 12 and the mass of glass which is to form the major element 13.

A stream of molten glass from a suitable glass melting furnace discharge orifice 70 is allowed to flow into the mold 65. As is illustrated, the orifice 70 and the mold 65 are relatively positioned so that the molten glass will flow into the mold and impinge on the mold surface 68 closely adjacent to, but in space relation to the edge of the minor segment 11. A suitable quantity of molten glass is allowed to accumulate in the mold and the stream is severed by means of a shearing device such as 71. The accumulated molten glass mass is progressively laterally moved across the surface 68 and across the surface 12 of the minor segment 11 by means of a pusher member 72 with a rolling or wiping action, the lateral movement being imparted to the molten glass before it has an opportunity to become unduly chilled and thereby possess a chilled skin. The rolling or wiping action of the molten glass across the minor segment will discharge in the air between the molten mass of glass and the minor segment, so that the entrapment of air in the weld will not occur. In the embodiment of the mold, as illustrated in FIGURES 9 to 11 the convex surface 68 allows the molten glass to flow much more rapidly and easily to the outer extremities and across the minor segment and thereby reduce the possibility of the glass becoming rapidly chilled before completion of the forming and fusing operation.

Immediately after the molten glass is distributed across the surface 68 and across the surface 12 of the minor segment 11 by the lateral thrust just described, it is given vertically downwardly directed thrust by means of a pressing member 73 having a surface 74 substantially complementary in shape to the surface 68. In actual practice, the wiping member 72 and the pressing member 73 may be the same member associated with suitable means for providing the required movement.

To prevent the molten glass from becoming unduly chilled upon its flowing into the molds, so as to posses a highly chilled skin, the molds are preferably preheated prior to the depositing of the molten glass therein. Also, the roll 24, the male mold member 36, the pusher member 72 and pressing member 73 must be preheated to avoid undue chilling of the glass which would prevent its distribution, as described. Any suitable source of heat, such as a clean gas flame or electrical resistance heating coils may be used for preheating the mold and the forming members. Also, there must not be too great a differential between the temperature of a mold and that of a minor segment as to cause fracture of the segment. A minor segment may be preheated prior to its placement in the mold recess or subsequent thereto, and may be preheated by means of electrical resistance heating coils. This preheating of a minor segment, preferably done just prior to its fusion with the molten glass prevents the molten glass from cracking the minor segment by rapid expansion of the segment glass during the fusion process. Since dirt or foreign matter in the area of fusion defeats the usefulness of the resultant composite structure. The preheating of the minor segment and the forming and fusion process should be carried out in a clean atmosphere, such as could be provided in a dust-free room.

Any shear marks or scars from a shearing device will be located on the surface of the molten glass mass in contact with the bottom surface of a mold at its place of initial contact therewith and on the surface of the molten glass vertically opposite thereto. The lateral thrust imparted to the mass of glass resulting in the rolling or wiping action thereof across a mold surface and a segment surface may shift the position of the latter marks or scars, but will not distribute them so as to be in contact with the finished surface of the minor segment, or, in other words, such marks or scars will not be finally positioned within the area of fusion with the optical surface of the minor segment. Any scars or marks will be in the area of finish-grinding and polishing of the blank and will thereby be removed when the composite blank is ground and polished to its ultimate form, so as to not impair the optical quality of the final ground and polished lens.

It will be noted that in practicing this invention, reference is made to the impinging of a molten glass stream onto the mold surface. It has been found that blanks exhibiting some or all of the aforementioned defects will be formed if gob feeding of the glass mass is substituted for orifice feeding. The defects which result in defective blanks when gob feeding is used apparently may be attributed to the highly chilled skin on the gob when it is fed to the mold and onto the molding surface, thereby preventing its complete distribution and allowing entrapment of air at the area of fusion with the minor segment, and also the lack of control of movement of the gob resulting in shear marks or scars becoming so positioned to be disposed in the area of fusion with the minor segment wherein they may not be ground and polished from the blank.

While this invention has been described in its preferred form, it is to be understood that this is by way of explanation and not by way of limitation.

I claim:

1. In a method of forming a multifocal lens blank at least one element of which is provided with a ground and polished surface of predetermined curvature, the improvement which comprises supporting the one element with its ground and polished surface facing upwardly, forming another element by impinging a stream of molten glass closely adjacent and slightly spaced from an edge of the ground and polished surface, accumulating a mass of molten glass on the area of stream impingement, discontinuing the flow of said molten glass so that said mass of molten glass is an individual quantity of accumulated molten glass that is adjacent and spaced from the polished surface, and progressively laterally moving a part of said individual quantity of accumulated molten glass across the ground and polished surface of the one element so as to fuse thereto in intimate contact therewith.

2. In the manufacture of a multifocal lens blank of the type embodying an element of one index of refraction having a ground and polished surface to which is fused another element of a different refractive index, the improvement which comprises supporting the one element with its ground and polished surface facing upwardly, impinging a stream of molten glass of said different refractive index closely adjacent to and slightly spaced from an edge of the ground and polished surface, accumulating a quantity of molten glass on the area of stream impingement, cutting off the stream of molten glass so that said mass of molten glass is an individual quantity of accumulated molten glass that is adjacent and spaced from the polished surface, and imparting a lateral force to a part of said individucal quantity of accumulated molten glass, so as to flow a part of said individual quantity of accumulated molten glass progressively across said surface and to fuse in intimate contact thereto.

3. A method of making multifocal lens blanks comprising, providing a segment blank of one index of refraction having at least one ground and polished surface, mounting said segment blank with said surface facing upward upon a mold surface having the general contour of the major blank, pouring a stream of molten glass of a different index of refraction into a portion of said mold in such a manner that it accumulates closely adjacent and spaced from said segment blank surface, cutting off said stream so as to provide an individual quantity of accumulated molten glass on said portion of said mold surface at a position adjacent and spaced from the segment blank, and laterally pushing a part of said individual quantity of accumulated molten glass across said segment blank surface and the remainder of said mold.

4. A method of making multifocal lens blanks comprising, providing a segment blank of one index of refraction having at least one ground and polished surface and at least one ground edge, mounting said segment blank with said surface facing upward and with the edges of said segment blank defining said surface substantially flush with a mold surface having the general contour of the major blank, pouring a stream of molten glass of a different index of refraction onto an area of said mold surface in such a manner that it accumulates in closely adjacent and spaced relation to said segment blank surface, cutting off said stream so as to provide an individual quantity of accumulated molten glass that is adjacent and spaced from the segment blank, and laterally pushing a part of said individual quantity of accumulated molten glass across the remainder of said mold surface and said segment blank surface and edge.

5. In a method of forming a multifocal lens blank at least one element of which is provided with a ground and polished surface of predetermined curvature and a ground edge, the improvement which comprises supporting the one element with its ground and polished surface facing upwardly, forming another element by impinging a stream of molten glass closely adjacent and slightly spaced from an edge of the ground and polished surface, accumulating a mass of molten glass on the area of stream impingement, discontinuing the flow of said molten glass so as to provide an individual quantity of accumulated molten glass that is adjacent and spaced from the polished surface, progressively laterally moving a part of said individual quantity of accumulated glass across the ground and polished surface of the one element so as to fuse thereto in intimate contact therewith, and thereafter only vertically pressing said glass to complete the formation of said blank.

6. In the manufacture of a multifocal lens blank of the type embodying an element of one index of refraction having a ground and polished surface to which is fused another element of a different refractive index, the improvement which comprises supporting the one element with its ground and polished surface facing upwardly, impinging a stream of molten glass of said different refractive index closely adjacent to and slightly spaced from an edge of the ground and polished surface, accumulating a quantity of molten glass on the area of stream impingement, cutting off the stream of molten glass so as to provide an individual quantity of accumulated molten glass that is adjacent and spaced from the polished surface, imparting a lateral force to a part of said individual quantity of accumulated glass, so as to flow at least a portion thereof progressively across said surface and to fuse in intimate contact thereto, and thereafter imparting only a vertical force to said glass to impart a final shape to said blank.

7. A method of making multifocal lens blanks comprising, providing a segment blank of one index of refraction having at least one ground and polished surface, mounting said segment blank with said surface facing upward upon a mold surface having the general contour of the major blank, pouring a stream of molten glass of a different index of refraction onto a portion of said mold surface in such a manner that it accummulates closely adjacent and spaced from said segment blank surface, cutting off said stream so as to provide an individual quantity of accumulated molten glass adjacent and spaced from the segment blank, laterally pushing a part of said individual quantity of accumulated molten glass across the remainder of said mold surface and said segment blank surface, and thereafter only vertically pressing said major blank to final shape.

8. A method of making multifocal lens blanks comprising, providing a segment blank of one index of refraction having at least one ground and polished surface, mounting said segment blank with said surface facing upward and with the edges of said segment blank defining said surface substantially flush with a mold surface having the general contour of the major blank, pouring a stream of molten glass of a different index of refraction onto a portion of said mold surface in such a manner that it accumulates in closely adjacent and spaced relation to said segment blank surface, cutting off said stream so as to provide an individual quantity of accumulated molten glass adjacent and spaced from the segment blank, laterally pushing a part of said individual quantity of accumulated molten glass across the remainder of said mold surface and said segment blank surface, and thereafter only vertically pressing said major blank to final shape.

References Cited in the file of this patent

UNITED STATES PATENTS

| | | |
|---|---|---|
| 488,049 | Babcock | Dec. 13, 1892 |
| 574,458 | Shuman | Jan. 5, 1897 |
| 661,025 | Ripley et al. | Oct. 30, 1900 |
| 862,648 | Miller et al. | Aug. 6, 1907 |
| 868,578 | Nicholls | Oct. 15, 1907 |
| 1,026,182 | Seymour | May 14, 1912 |
| 2,026,606 | Bausch | Jan. 7, 1936 |
| 2,383,810 | Masculine | Aug. 28, 1945 |
| 2,433,013 | Ziegler | Dec. 23, 1947 |
| 2,478,812 | Drake | Aug. 9, 1949 |
| 2,640,299 | Sheard et al. | June 2, 1953 |
| 2,734,315 | Poundstone | Feb. 14, 1956 |

FOREIGN PATENTS

| | | |
|---|---|---|
| 192,758 | Germany | Sept. 18, 1906 |
| 739,341 | Great Britain | Oct. 26, 1955 |